(12) United States Patent
Glucksman et al.

(10) Patent No.: US 7,270,050 B2
(45) Date of Patent: *Sep. 18, 2007

(54) BEVERAGE MAKING APPARATUS

(75) Inventors: Dov Z Glucksman, Danvers, MA (US);
Gary P McGonagle, Lynn, MA (US);
Laura J Nickerson, Fitchburg, MA
(US); John P Oliver, Gulf Breeze, FL
(US)

(73) Assignee: Appliance Development Corporation,
Danvers, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/734,804

(22) Filed: Apr. 13, 2007

(65) Prior Publication Data

US 2007/0175338 A1    Aug. 2, 2007

Related U.S. Application Data

(63) Continuation of application No. 11/566,419, filed on Dec. 4, 2006, which is a continuation of application No. 11/129,041, filed on May 14, 2005.

(51) Int. Cl.
*A47J 31/18* (2006.01)
(52) U.S. Cl. ............................................ 99/297; 99/287
(58) Field of Classification Search ............. 99/302 P, 99/297, 287, 302 R, 300, 315
See application file for complete search history.

(56) References Cited

U.S. PATENT DOCUMENTS

| 51,741 | A | * | 12/1865 | Nason | 99/301 |
| 3,292,526 | A | * | 12/1966 | Heier | 99/289 R |
| 3,657,993 | A | * | 4/1972 | Close | 99/297 |
| 5,103,716 | A | | 4/1992 | Mikkelsen | |
| 5,146,839 | A | | 9/1992 | Gockelmann et al. | |
| 5,402,706 | A | | 4/1995 | Locati | |
| 5,636,563 | A | | 6/1997 | Oppermann et al. | |
| 5,887,510 | A | * | 3/1999 | Porter | 99/287 |

* cited by examiner

*Primary Examiner*—Reginald L. Alexander
(74) *Attorney, Agent, or Firm*—George A. Herbster

(57) ABSTRACT

A brewing apparatus for infusing compacted ground coffee in a grounds cup at a brewing station with heated water under pressure. At a brewing station, a piston head with an active seal that is spaced from the grounds cup wall during motion, extends into the grounds cup. When the piston head begins to compact the ground coffee it activates the seal to form a sealed upper end of a brewing chamber. Hot water is admitted to the brewing chamber to produce the coffee. When the brewing cycle is completed, the piston head displaces further to force additional coffee from the grounds. Then the piston head retracts to allow the infusion chamber assembly to be removed for cleaning.

14 Claims, 17 Drawing Sheets

BEVERAGE MAKING APPARATUS

CROSS REFERENCE TO RELATED APPLICATION

This application is a continuation of U.S. application Ser. No. 11/566,419 filed Dec. 4, 2006, now abandoned which is co-pending with U.S. patent application Ser. No. 11/129,041 filed May 14, 2005 for a coffee making apparatus.

BACKGROUND OF THE INVENTION

1. Field of the Invention

This invention generally relates to apparatus for brewing beverages by directing a liquid, such as hot water, across a compacted infusible material, such as ground coffee beans, in a sealed infusion chamber.

2. Description of Related Art

A large number of commercial devices are available for brewing beverages, particularly coffee, by infusing material with a liquid. Prior art coffee makers have incorporated a variety of percolating, drip, steeping and other brewing approaches. A large number of these coffee makers were also designed to brew coffee in batches, for example, 4-cup to 12-cup batches. Such devices, however, were characterized by difficulties in maintaining coffee flavor over time, in controlling waste as occurred by making excessive coffee that was then discarded, and in cleaning and maintenance of the coffee makers.

The advent of espresso machines introduced new coffee brewing concepts. Espresso machines produce a small quantity of coffee at any given time, such as a cup of cappuccino or espresso. Espresso was brewed and continues to be brewed by placing an appropriate quantity of ground espresso coffee into an infusion chamber, compacting the ground coffee and closing that chamber. Hot water under pressure infuses the compacted coffee to extract its essence and directs the beverage to a cup.

This process has become very popular, and there are a variety of implementations primarily for use in espresso machines, but also for machines for brewing coffee. For example, U.S. Pat. No. 4,457,216 to Dremmel discloses an infusion chamber with hydraulically operated upper and lower pistons that close a scalding chamber. The scalding chamber contains coffee grounds and receives hot water. During the brewing process the loose coffee swells. When brewing is complete, the lower piston rises to compress the swollen grounds extract the brewed coffee that passes through the lower piston to a cup or other serving receptacle. After the brewing cycle is complete, the upper piston retracts. Then the lower piston can elevate to position the used compressed coffee grounds above the infusion chamber for removal.

U.S. Pat. Nos. 4,796,521 and 5,255,594 to Grossi disclose infusion chambers with a piston that delivers hot water by means of a metering unit. The piston is operated to allow the introduction of a filter carrier element and for compressing the coffee powder. U.S. Pat. No. 4,796,521 discloses a direct introduction of ground coffee from a coffee grinder into the infusion chamber. U.S. Pat. No. 5,255,594 discloses a motor drive.

U.S. Pat. No. 5,230,277 to Bianco discloses two pistons mounted on circulating ball screw actuators for closing the top and bottom of an infusion chamber. The pistons are brought together to compact ground coffee after which hot water is introduced for infusion. After the brewing cycle, both pistons can be raised so the lower piston can eject the used coffee grounds.

In U.S. Pat. No. 5,237,911 to Aebi a piston moves into an infusion chamber to compress ground coffee. The bottom of the piston comes into direct contact with the compressed ground coffee. There is no specific disclosure of a seal for preventing the escape of water from the infusion chamber past the piston.

U.S. Pat. No. 5,277,102 to Martinez discloses a vending machine with a lower piston. The lower piston rises to compact ground coffee against a fixed upper plunger or piston.

In U.S. Pat. No. 5,280,747 to Bonneville an espresso machine has a vertically movable snout for supplying hot water under pressure to ground coffee held in a filter. A cylinder or piston moves against the action of an antagonist spring to cause the snout to penetrate the package and compress the ground coffee.

U.S. Pat. No. 5,302,407 to Vetterli discloses a brewing or infusion chamber with a movable piston. The brewing chamber has an open top. A closure piston opens and closes the brewing chamber. Pressurized hot water causes the movable piston to move upward to compress the ground coffee.

In U.S. Pat. No. 5,402,706 to Locati an infusion chamber has a lower filter piston and an upper, two-part infuser piston. The infuser piston has a seal. One part of the upper piston slides into the other part against an opposing spring resistance. The seal remains in a contracted condition at a narrow diameter of a conical seat while the infusion piston enters the infusion chamber. During an operating stage, however, the distance between the two portions of the piston decreases causing the seal to shift upward to a maximum diameter of a conical seat. This process provides a seal and eliminates brushing and scraping of the packing to minimize wear and tear.

U.S. Pat. No. 5,911,810 to Kawabata discloses a coffee brewing system in which a vertically movable cylinder receives ground coffee and has a top opening. A vertically movable, upwardly urged plunger compacts grounds after second cylinder is elevated.

U.S. Pat. No. 6,035,762 to Ruckstuhl discloses an espresso machine with a brewing chamber in which two brewing chamber parts can be displaced relative to one another. In a closed position they form a brewing chamber for filter capsules. One of the members has multiple nozzles for directing hot water across the coffee. This approach allows the use of coffee pods of different sizes.

In U.S. Pat. No. 6,606,938 to Taylor, a beverage brewing apparatus includes a disposable cartridge that is initially pierced and vented by a tubular outlet probe when an arm pivots a water disposing head into a sealing relationship with the top of the removable cartridge.

U.S. Pat. No. 6,711,988 discloses an espresso machine with a variable volume infusion chamber. A piston with a static seal, shown as an O-ring, seals against and moves relative to an infusion cylinder. During brewing the piston elevates underwater pressure to allow swirling. When a predetermined pressure is obtained, a frothing valve opens. The piston moves toward the frothing valve to press the coffee grounds under a spring-generated force.

These and other features have been incorporated in a number of single-cup coffee makers, particularly for espresso machines for commercial use, as in restaurants, coffee shops and the like. However, such machines are expensive and not economically attractive to most consumers even though they may make the best coffee.

Recently several manufactures have introduced so-called "cup-at-a-time" coffee makers. They replace such pistons with hinged top units that latch to a base. A consumer must manually unlatch the hinged top unit, open it to expose a container for receiving either proprietary coffee pods or loose coffee. Then the consumer must manually close and latch the top unit to compact the coffee and form the sealed infusion chamber.

With cup-at-a-time coffee makers clean up requires the top to be reopened. If the coffee is made with loose grounds, the grounds cup must be removed so the used grounds can be discarded. If a pod is used, it can be lifted from a grounds cup without having to remove the grounds cup.

In many applications consumers desire automatic systems that incorporate coffee grinders. Such systems are characterized by locating the brewing chamber at an inaccessible location so it becomes impossible or, at best, very difficult, to clean the brewing chamber. Cleaning the brewing chamber in any such coffee maker is very important. If regular cleaning is not undertaken, oils and organic acids present in coffee attack the seal materials used to define the brewing chamber. Such substances also accumulate on the walls of the brewing chamber. If the seal slides over the walls, this material produces a rough surface that can damage the seals with use.

Some commercially available consumer-oriented coffee makers limit the consumer to proprietary prepackaged coffee filter pods. This can limit consumer choices. Also some consumer-oriented coffee makers are limited to making espresso. These factors and expense limit their market to consumers.

What is needed is apparatus for brewing a beverage, such as coffee, that is economical and easy to use. Specifically, what is needed is an economical coffee brewing apparatus that eliminates manual operation of latches, facilitates the incorporation of a grinder, simplifies cleaning and maintenance and is adapted for accepting ground coffee in a variety of forms.

SUMMARY

Therefore it is an object of this invention to provide brewing apparatus for the consumers that has many of the advantages of more expensive commercial systems and that is economical, convenient to use and easy to maintain.

Another object of this invention is to provide brewing apparatus that eliminates manual latching mechanisms.

Still another object of this invention is to provide brewing apparatus that is adapted for use with a grinder while maintaining separation between their respective functions in order to facilitate use and maintenance.

Still another object of this invention is to provide a coffee brewing system that is adaptable for receiving coffee grounds in a variety of forms.

Yet still another object of this invention is to provide a coffee brewing system in which a grounds cup can be withdrawn for filling or cleaning without the need for releasing manual latches or breaking seals.

Yet another object of this invention is to provide a coffee brewing apparatus that can be used for brewing regular coffee or espresso.

In accordance with this invention, beverage brewing apparatus includes a supply for liquid under pressure for application to an infusible material. An infusion chamber receives the infusible material and includes a side wall, an open top and a perforated bottom. A piston compacts the infusible material and disperses the liquid. A piston head is adapted to close the infusion chamber to define a brewing chamber. A piston rod moves the piston head past the open top. The piston head has an active peripheral seal with a first structure fixed to the piston rod to form a rigid support. A second structure is adapted for compacting the infusible material and dispersing the liquid. A sealing structure attaches to each of the first and second structures for suspending the second structure from the first structure. A spring, intermediate the first and second structures, separates them when the piston head is spaced from the infusible material whereby the seal contracts from the side wall of the infusion chamber. When the second structure overcomes the spring bias during compaction of the infusible material, the seal expands into a sealing engagement with the side wall. The piston head and the infusion chamber form the brewing chamber.

In accordance with another aspect of this invention, a beverage brewing apparatus includes a supply for liquid under pressure to be directed to an infusible material. The apparatus includes an infusion chamber with a side wall, an open top and a perforated bottom. A piston includes a piston rod and a piston head that form a brewing chamber in the infusion chamber. The piston rod moves the piston head past the open top, The piston head has an active peripheral seal comprising a first disk fixed to the piston rod for forming a rigid support, a second disk, a seal captured by each of the first and second disks for suspending the second disk from the first disk, and a spring intermediate the first and second disks. The spring separates the first and second disks when the piston head is spaced from the infusible material whereby the seal contracts from the infusion chamber side wall. The second disk overcomes the spring bias during compaction of the infusible material whereupon the seal expands into a sealing engagement with the side wall and the piston head and the infusion chamber form the brewing chamber.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF ILLUSTRATIVE EMBODIMENTS

Figure 1:
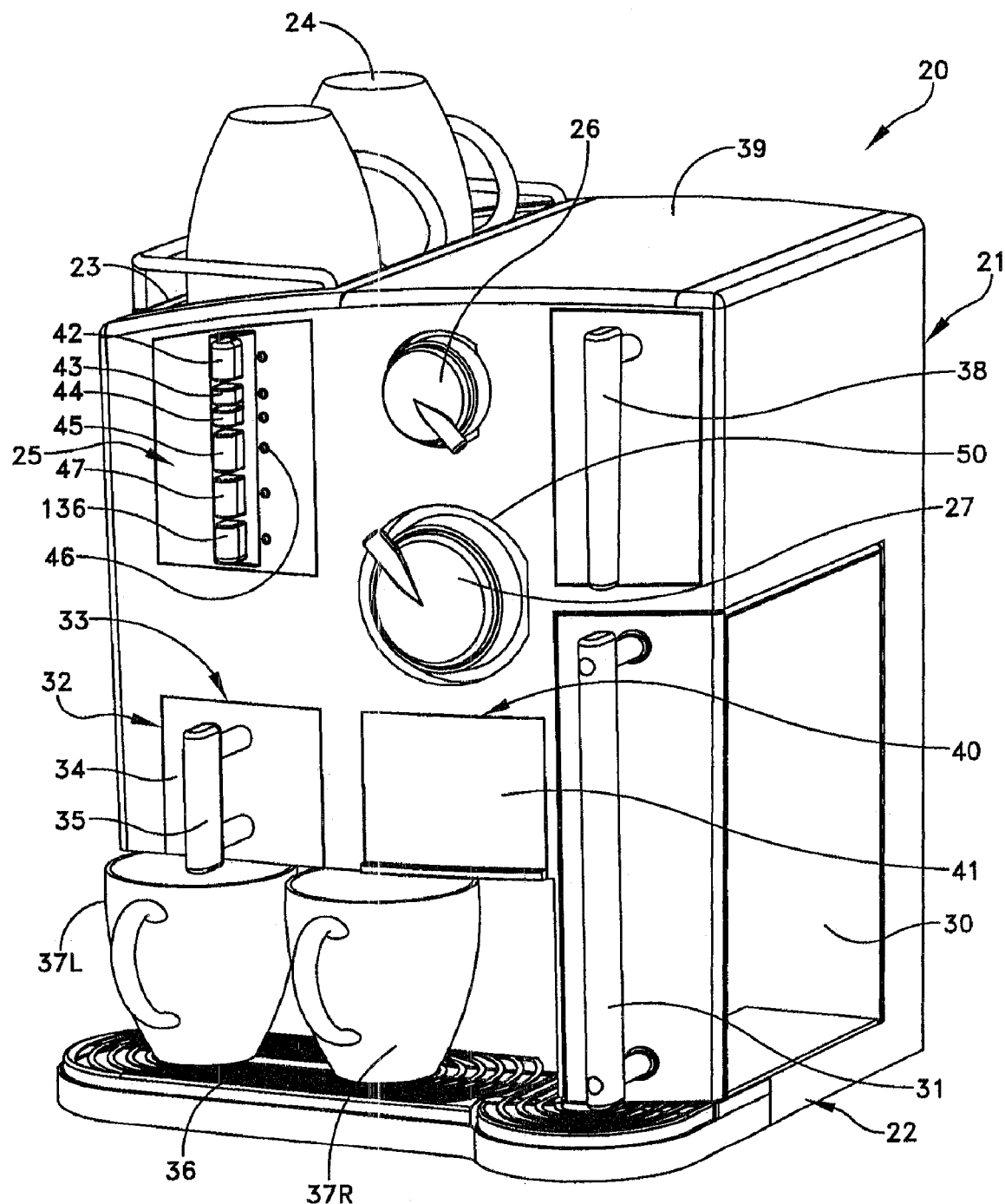
FIG. 1 is a perspective view of an espresso machine incorporating this invention.

FIG. 1 depicts one embodiment of an apparatus of this invention for brewing beverages, such as coffee, by supplying a heated liquid, such as hot water, under pressure to an infusible material in an infusion chamber. Specifically, FIG. 1 depicts such apparatus in the form of an espresso machine 20 with a housing 21 with and on a base 22. The housing 21 includes a cup warmer 23 for cups, such as the cup 24, so cups can be preheated before being filled with espresso. The housing includes a control panel 25, a brewing/steam control knob 26 and a grind fineness adjustment knob 27 for any included coffee grinder. A water reservoir or tank 30 on the base 22 has an integral handle 31 to facilitate removal and filling.

FIG. 1 depicts a removable, reusable, infusion chamber 32 at a brewing station 33 that includes a grounds cup holder 34 with an integral handle 35.

A removable drip tray assembly 36 resting on the base 22 provides a facility for supporting one or two cups 37L or 37R or both. The housing 21 also supports a steam nozzle 38 and a coffee bean hopper door 39 that covers a hopper 39A in FIG. 2 that directs coffee beans into any included grinder. A fill station 40 is located at a fill station door 41

In use a consumer brews one or two cups of coffee by activating a power-on switch 42 and by checking the water reservoir 30 for a sufficient water level. Then the individual grasps the handle 35 to withdraw the infusion chamber assembly 32 from the brewing station 33 in a straight-forward motion to deposit preground coffee or prepackaged ground coffee into the infusion chamber assembly 32.

If freshly ground coffee is desired, the individual inserts the infusion chamber assembly 32 into the fill station 40 through the fill station door 41 again with a straight-forward motion. If the fill station 40 has a coffee grinder, the individual moves the fineness adjustment knob 27 to a desired position and selects either a one-cup or two-cup quantity by means of a one-cup switch 43 or a two-cup switch 44. Activating the switch 45 initiates the grinding operation that deposits the appropriate quantity of ground coffee into the infusion chamber assembly 32. Alternatively the fill station would comprise a container for ground coffee and a dispenser for depositing pre-measured quantities of coffee into the infusion chamber assembly 32.

When the filling operation is completed, the individual merely withdraws the infusion chamber assembly 32 from the fill station 40, whereupon the fill chamber door 41 closes. Then the individual inserts the infusion chamber assembly back into the brewing station 33. These operations are achieved without any need to manipulate latches or other mechanisms.

When various visual annunciators, such as LEDs or like light sources 46, indicate brewing can begin and the brew/steam control selector 26 is in the brewing position, depressing a brewing switch 47 initiates the brewing operation. The consumer sees the result when brewed coffee begins to fill the coffee cups 37L and 37R. If only one cup is to be brewed, it is merely necessary to remove the cup 37R and center the cup 37L below the handle 35, or vice versa.

Emptying the used coffee grounds requires the individual to withdraw the infusion chamber assembly 32 from the brewing station 33 to dispose of the used coffee grounds and to clean the grounds cup. Periodically an individual can initiate a cleaning cycle whereby a compacting structure becomes readily accessible, as described later. The control 27 can include an access ring 50 that can be used to remove the front burr of the grinder for cleaning.

When it is desired to apply steam for foaming milk or for preheating a cup the consumer merely shifts the BREW/STEAM control 26 to a steam position. Steam will be dispensed from the bottom of the steam nozzle 38.

Figure 2:
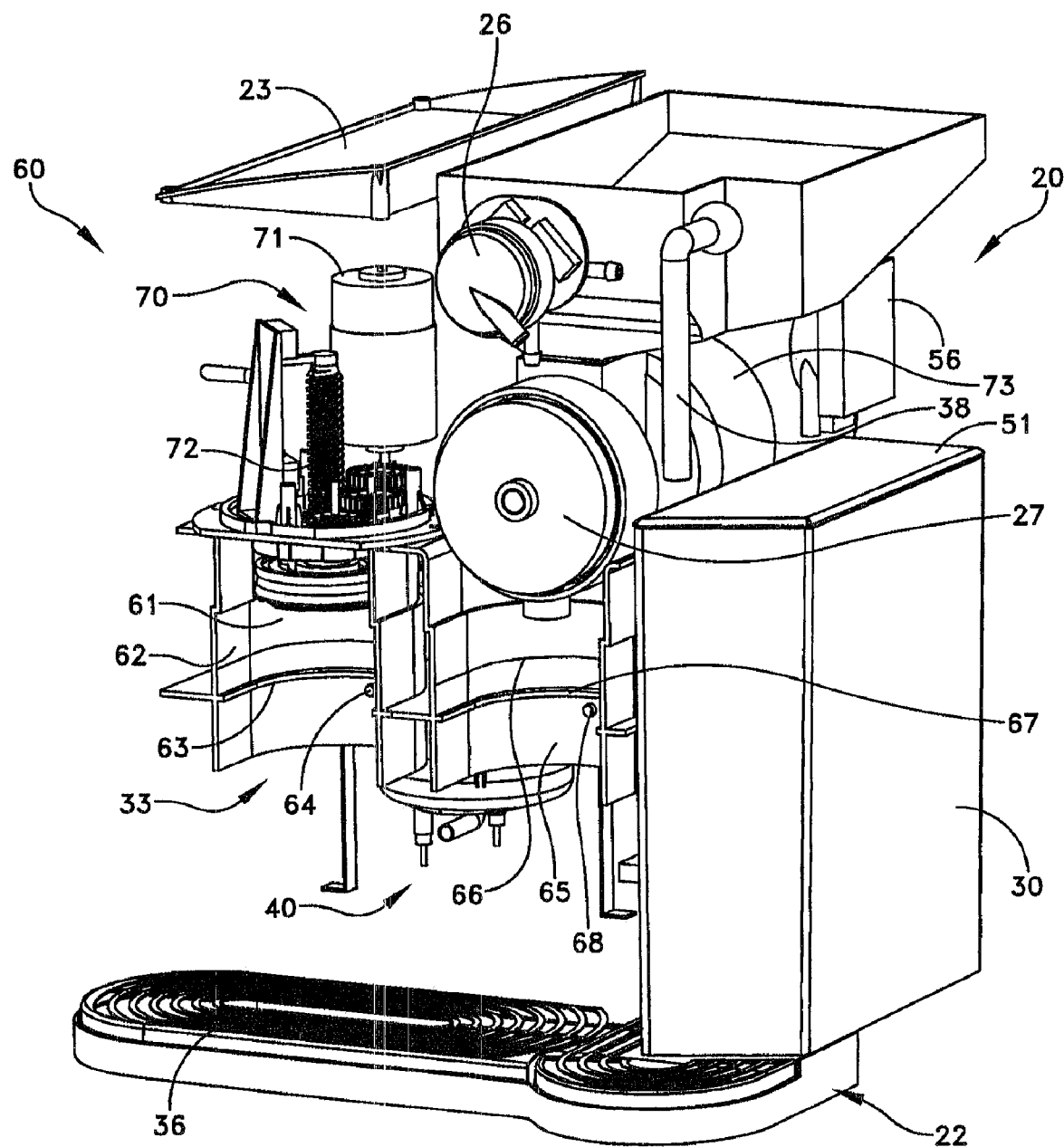
FIG. 2 is a perspective view of the interior portions of the espresso machine shown in FIG. 1 taken from the right front.
Figure 3:
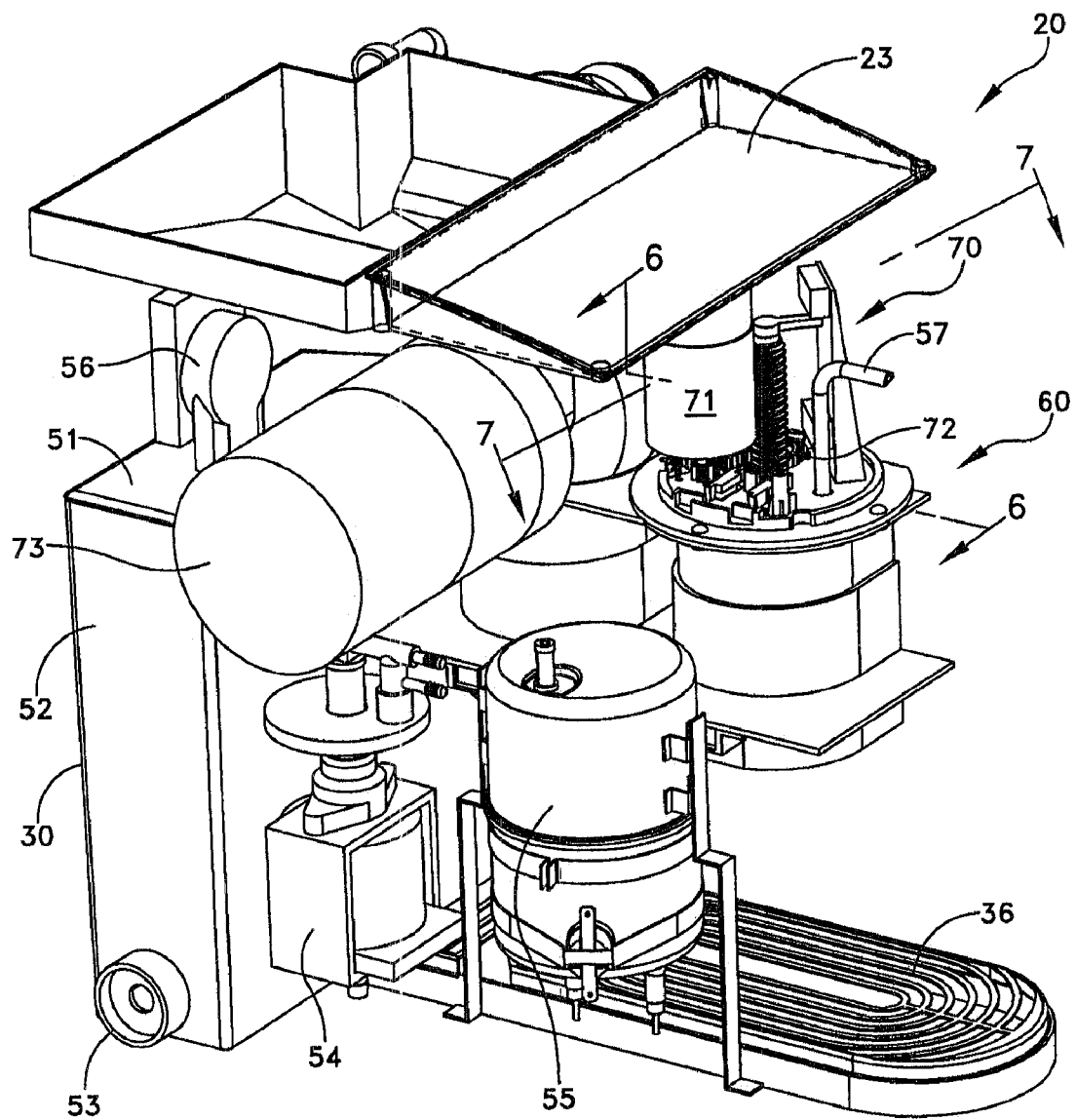
FIG. 3 is a perspective view of the espresso machine shown in FIG. 1 taken from the left rear.

FIGS. 2 and 3 depict the espresso machine 20 with the housing 21 removed to view the major components including the base 22, the water reservoir 30, the removable drip tray assembly 36 and the cup warmer 23. FIG. 2 additionally discloses the BREW/STEAM control valve 26, the grind fineness adjustment knob 27 and the steam nozzle 38.

The water reservoir 30 has a hinged top 51 and rear wall 52 with a connector 53. The connector 53 includes a check valve (not shown) that closes when the water reservoir 30 is removed from the espresso machine 20 for filling. When a full water reservoir 30 is inserted and seated in the espresso machine 20, a connector on the apparatus, not shown but well known in the art, interacts with the connector 33 to open the check valve. Water is then available to a pump 54 shown in FIG. 3.

The pump 54, when active, pumps cold water into a boiler 55 through a conventional flow meter 56. Tubing, not shown for purpose of clarity, conveys hot water from the boiler 55 to an inlet hose 57 on a compacting assembly 60 that forms a brewing chamber in cooperation with the infusion chamber assembly 32 that is inserted into the brewing station 33. Heat from the boiler 55 elevates the temperature of the cup warmer 23.

As shown in FIG. 2, at the brewing station 33 the espresso machine includes a semi-cylindrical support portion 61 and two tangential planar wall extensions 62 that carry a shelf 63. The shelf 63 acts as a support for the infusion chamber assembly 32, particularly the grounds cup holder 34. An interlock 64 provides an enabling input to a brewing controller when the infusion chamber assembly 32 is fully seated and properly aligned in the brewing station 33.

The fill station 40 has a similar structure with a semi-cylindrical support portion 65 and two tangential planar wall portions 66. A shelf 67, similar to the shelf 63, supports the infusion chamber assembly 32 for receiving ground coffee. An interlock 68 provides an enabling signal to a controller when the infusion chamber assembly 32 is fully seated and aligned in the fill station 40.

Still referring to FIGS. 2 and 3, the compacting assembly 60 includes a piston assembly 70 driven, in this embodiment, by a motor 71 through a speed reduction gear mechanism 72. In this specific embodiment the apparatus 20 also includes a coffee grinder 73 at the fill station 40 that grinds beans to ground coffee of a selected coarseness or fineness.

Figure 4:
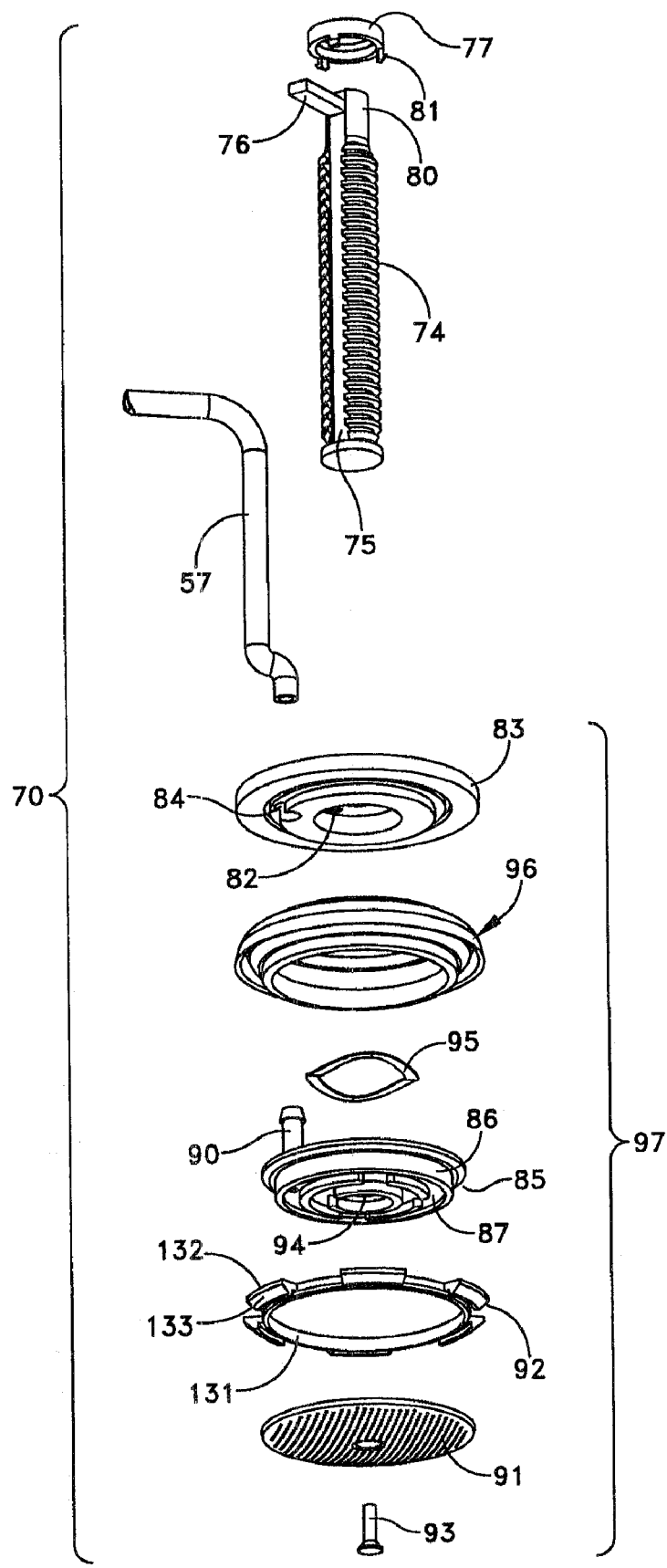
FIG. 4 is an exploded view of a compacting structure used in the espresso machine of FIGS. 1 through 3.

FIG. 4 depicts the piston assembly 70. It includes a threaded piston rod 74 characterized by an axially extending slot 75 that engages a stationary base plate for preventing rotation. A radial arm 76 serves as a switch actuator for limit switches as described later. A threaded rod retainer 77, overlying an upper end 80 of the threaded piston rod 74, includes a plurality of clips 81. The clips 81 engage corresponding apertures 82 in a top disk 83 as more specifically disclosed in FIG. 5.

Figure 5:
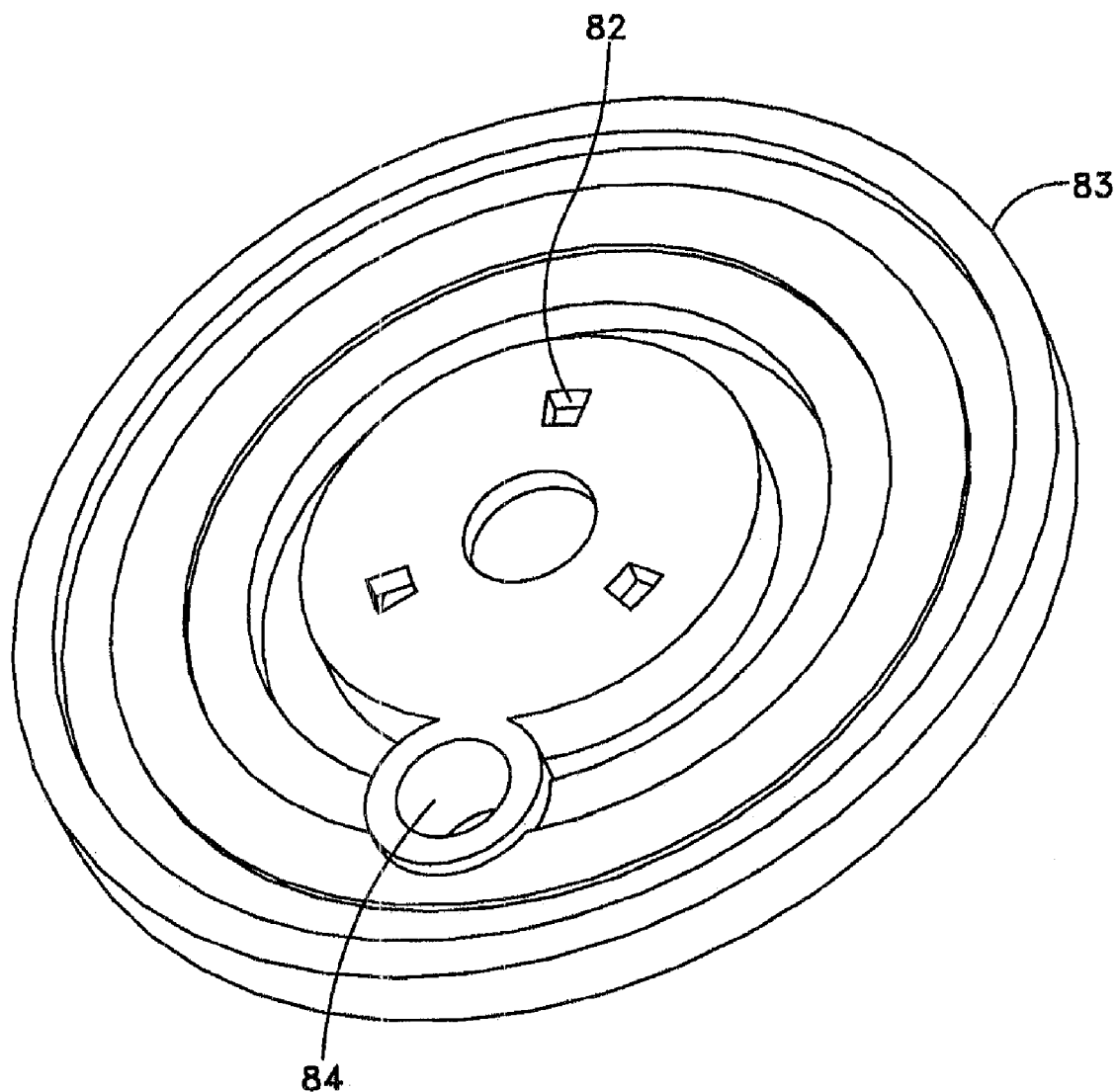
FIG. 5 is a detail of a top disk shown in FIG. 4.

FIG. 5 is a perspective view taken from above the top disk 83. The top surface of the top disk 83 has a plurality of circumferential lands and grooves that provide a rigid structure while minimizing its weight and material. The top disk 83 additionally includes a passage 84 for enabling a connection to the inlet hose 57 in FIG. 3 that connects to the boiler 55.

Referring again to FIG. 4, a bottom disk 85 includes an axial shoulder 86 and a bottom labyrinth 87. The labyrinth 87 facilitates the dispersal of water exiting a nipple 90 across the extent of and through a supported perforated disk 91 as described later. A guide ring 92 is axially coextensive with the axial shoulder 86 and provides peripheral support for the perforated disk 91. A screw 93 engages a central threaded aperture 94 accessible from the bottom of the bottom disk 85 thereby to fasten the bottom disk 85, the perforated disk 91 and guide ring 92 into a subassembly. In this assembly the free ends of axially extending walls forming the labyrinth 87 support the perforated disk 91 so it does not deform when it engages ground coffee in the infusion chamber assembly 32.

A wavy spring 95 lies intermediate the top disk 83 and bottom disk 85. The top disk 83 and bottom disk 85 sandwich a seal 96 characterized by a radially contracted state and a radially expanded state. The top disk 83, bottom disk 85, perforated disk 91, guide ring 92, screw 93, wavy spring 95 and seal 96 thereby form a piston head 97 that attaches to the threaded piston rod 74 and provides an active peripheral seal structure. As described in more detail later, the seal 96 attaches to the bottom disk 85 and to the top disk 83. When the threaded piston rod 74 is in a retracted position, the wavy spring 96 exerts a force that tends to separate the top disk 83 from the bottom disk 85. Under these conditions the seal 96 relaxes, has a minimum diameter and is radially contracted. When the axial distance between the top disk 83 and bottom disk 85 decreases, the wavy spring 95 compresses and the diameter of the seal 96 increases so the seal 96 moves to the radially expanded state.

The seal 96 performs several functions. First, the seal 96 engages the cylindrical wall 112 of the grounds cup 102 to confine any water or brewed coffee to the brewing chamber 98. Second, the seal 96 assures that all the hot water admitted to the labyrinth in FIG. 4 passes through the perforated disk 91 and into the ground coffee in the brewing chamber 98. As a third function, the seal 96 acts as a flexible coupling that supports the bottom disk 85 on the piston head 97. The specific construction of the seal 96 and its performance of these functions are described later.

Figure 6:
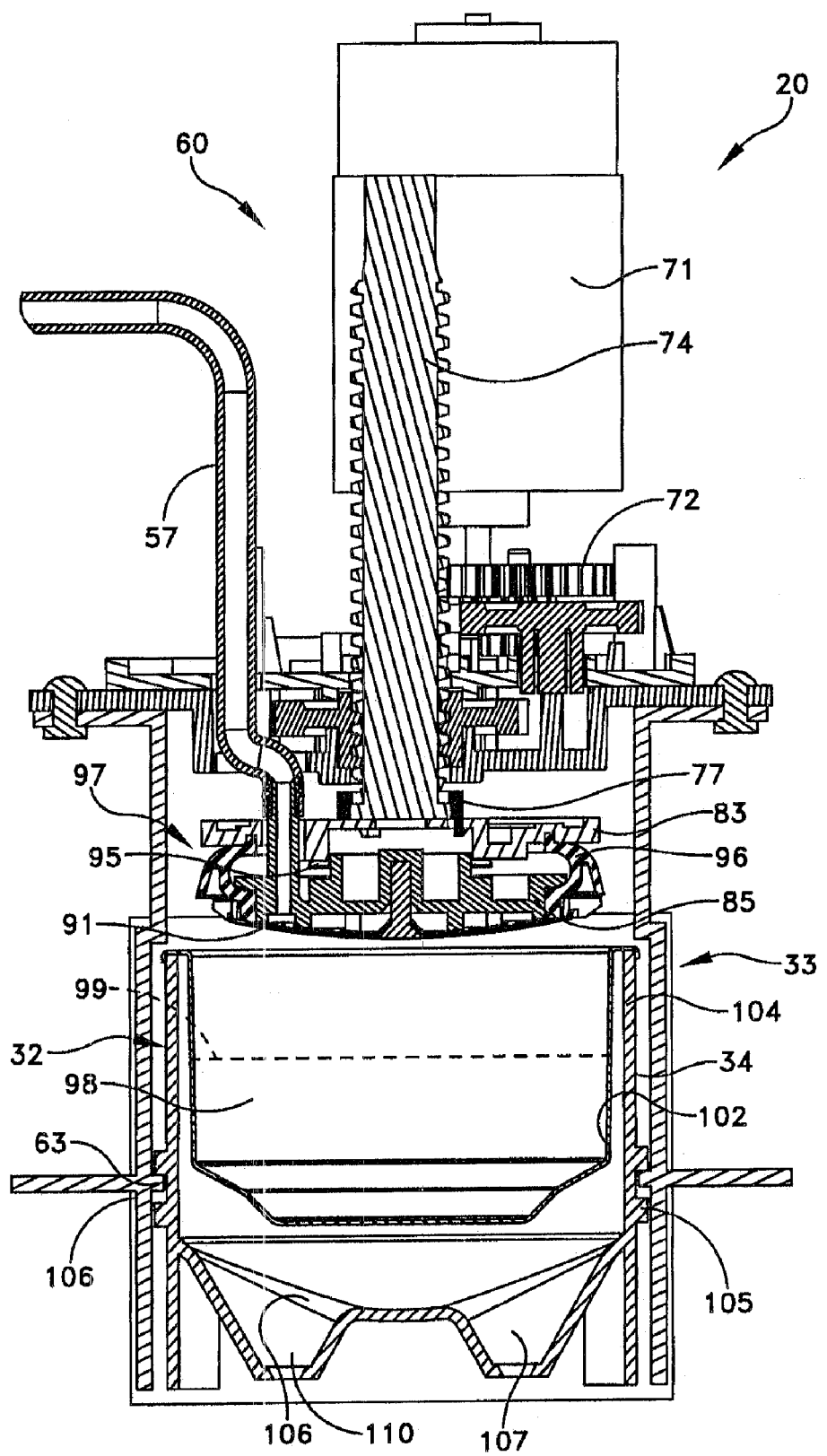
FIG. 6 is a view in section of a portion of the espresso machine taken along lines 6-6 in FIG. 3.
Figure 7:
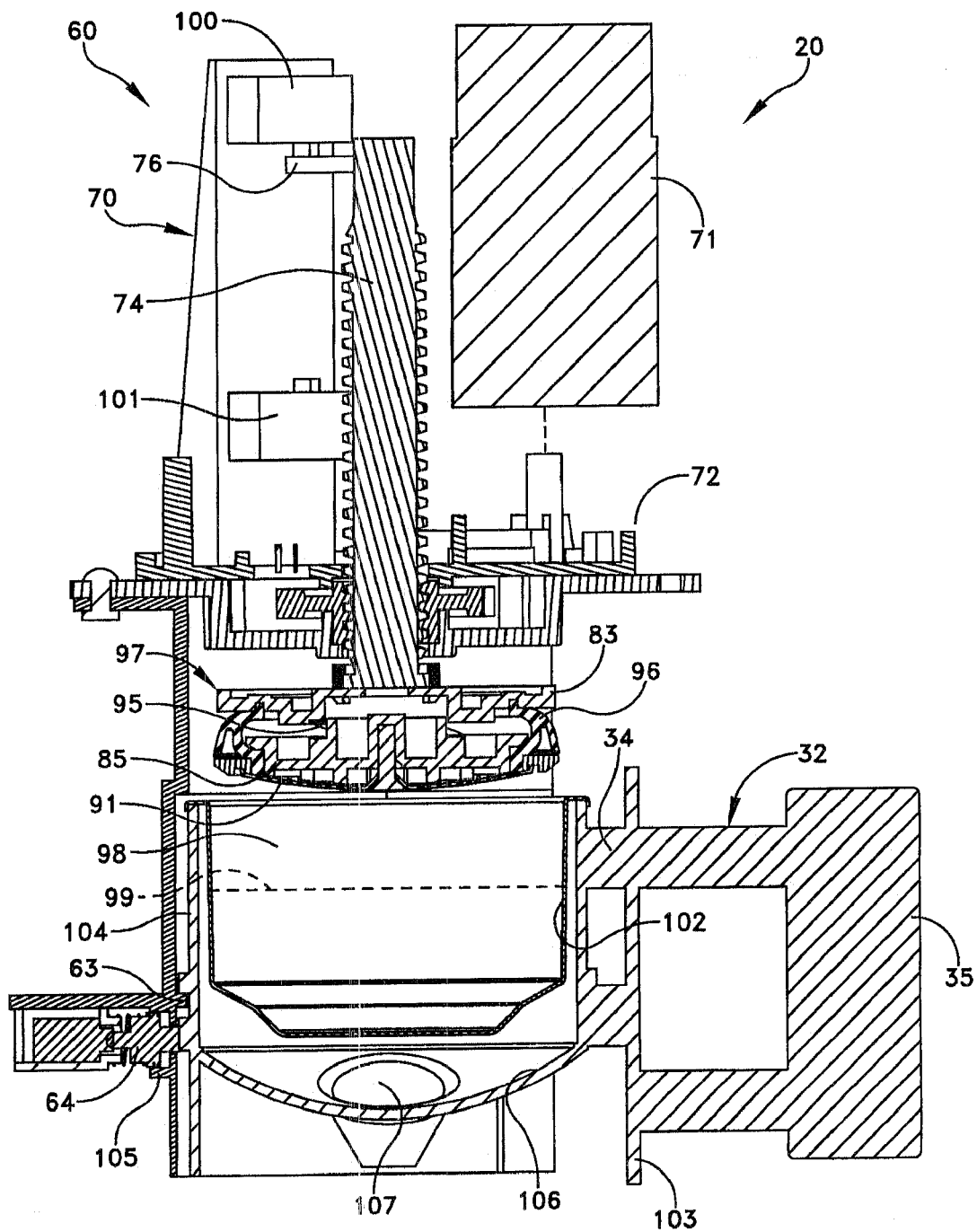
FIG. 7 is a section view of the portion of the infusion chamber taken along lines 7-7 in FIG. 6.

FIGS. 6 and 7 are useful in understanding the mechanical arrangements of the compacting assembly 60 and the infusion chamber assembly 32. When the piston head 97 is positioned in the grounds cup 102 at a position shown by dashed line 99 and sealed by the seal 96, the area below the piston head 97 bounded by the infusion chamber assembly 32, specifically the grounds cup 102, becomes a brewing chamber.

In these views, however, the motor 71 and gear train 72 have retracted the threaded piston rod 74 and the piston head 97 to an upper limit or fully retracted position as defined when the radial arm 76 on the threaded piston rod 74 engages an upper limit microswitch 100. A lower limit microswitch 101 defines a lower-most position or range of travel. When the piston is fully retracted, the infusion chamber assembly 32 is easily removed from the brewing station 33.

Figure 8:
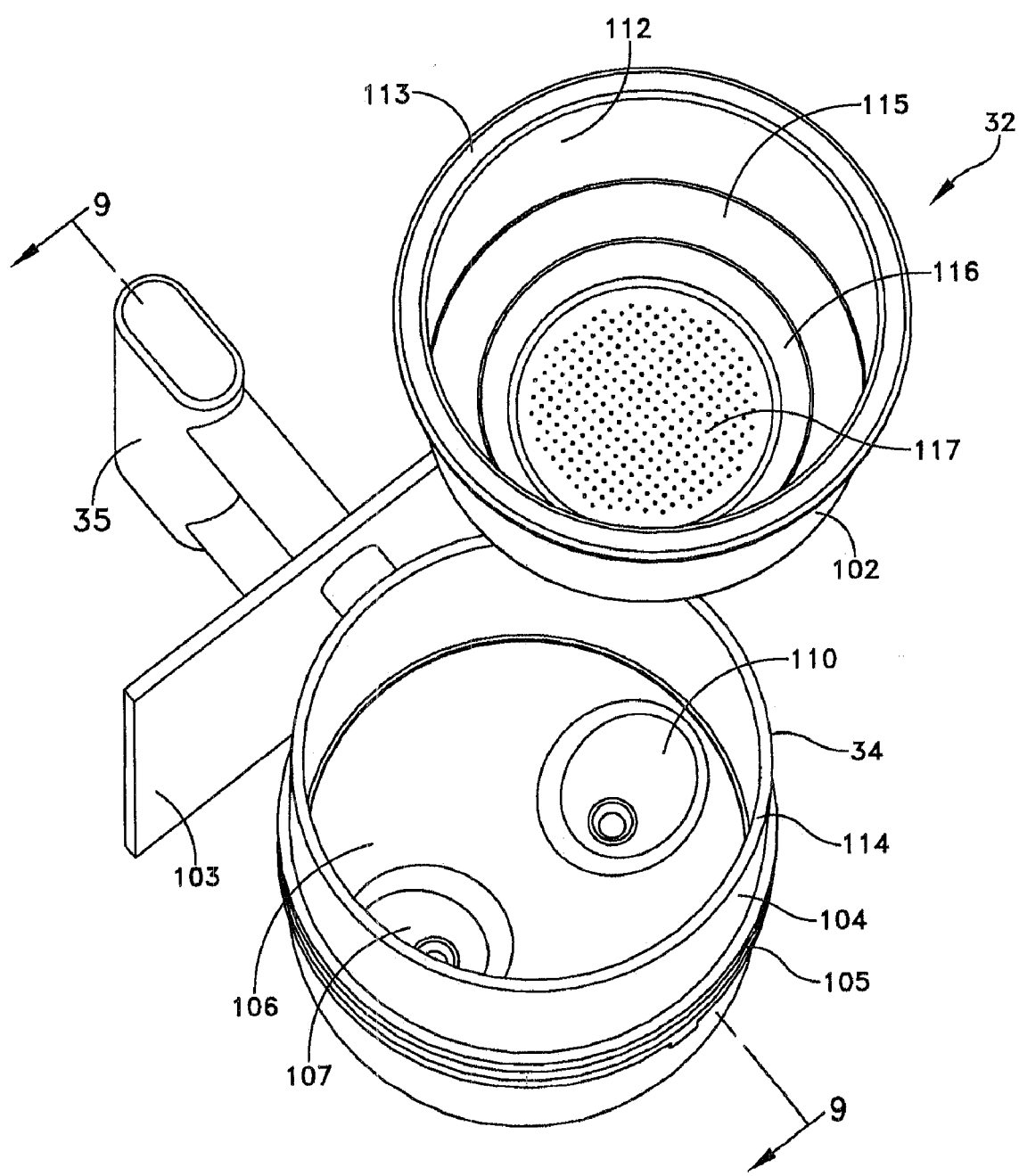
FIG. 8 is an exploded perspective view of a infusion chamber assembly that receives ground coffee.
Figure 9:
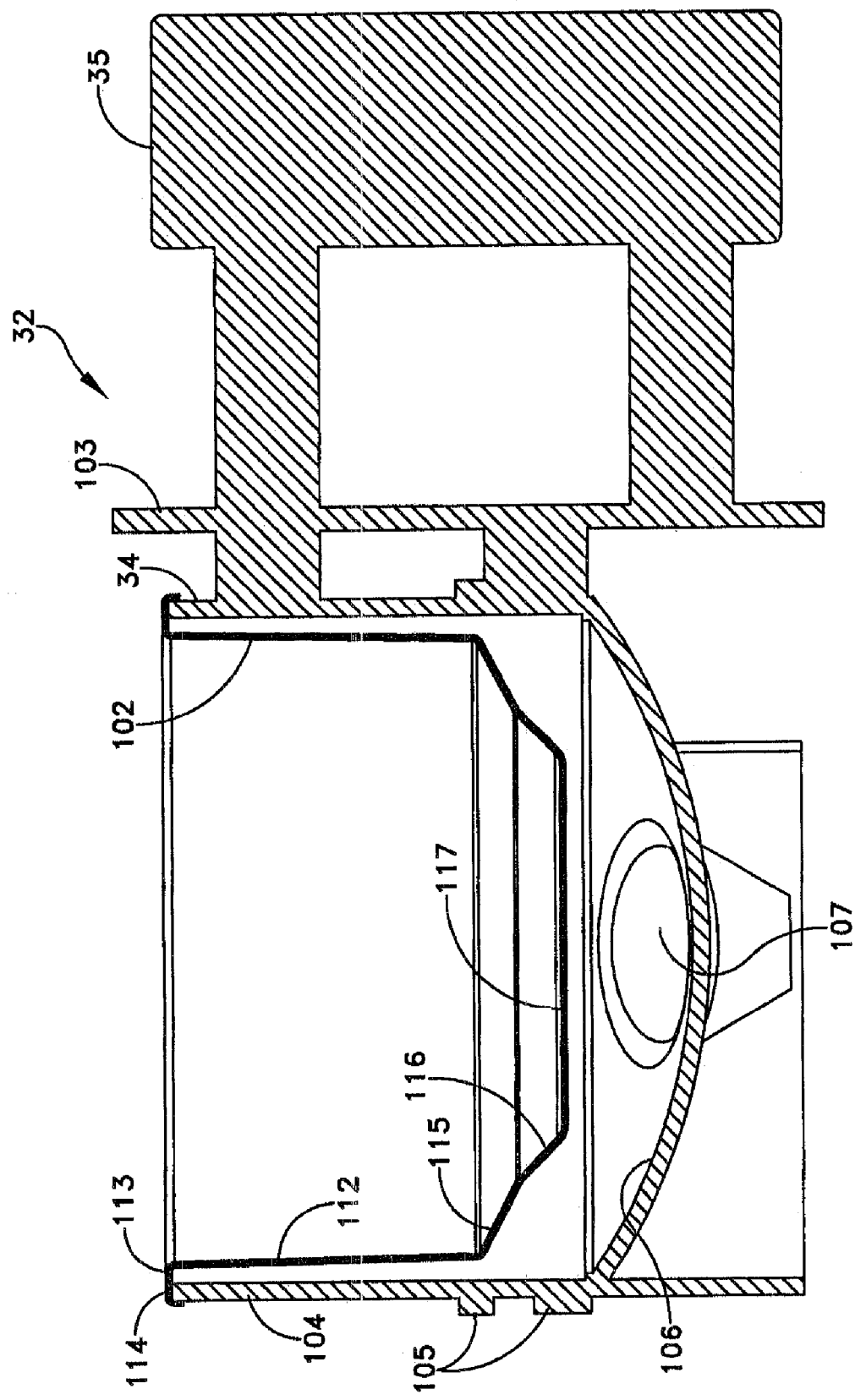
FIG. 9 is a cross section of the infusion chamber assembly of FIG. 8.

FIGS. 8 and 9 depict the infusion chamber assembly 32 with the grounds cup holder 34 and a grounds cup 102. The grounds cup holder 34 includes a face plate 103 with the integral handle 35 and an integral cylinder 104. Spaced circumferential ribs 105 on the cylinder 104 form a channel that engages the shelf 63 that acts as a supporting track at the brewing station 33 shown in FIG. 2 to position the infusion chamber assembly 34 below the compacting assembly 60. The ribs 105 also engage the shelf 67 in FIG. 2 that acts as a track at the fill station 40.

Still referring to FIGS. 8 and 9, the grounds cup holder 34 has a concave bottom 106, a right dispensing port 107 and a left dispensing port 110. During brewing, coffee exits from both of these ports. When two coffee cups, such as the coffee cups 37L and 37R are arranged as shown in FIG. 1, coffee is dispensed into the two cups simultaneously. However, the spacing between the ports 107 and 110 is such that when a single cup is centered about the handle 35, coffee from both dispensing ports 107 and 110 will be directed into a single cup.

Referring again to FIGS. 8 and 9, the grounds cup 102 has a cylindrical wall 112 that extends from an open top with a lip 113 that engages a top edge 114 of the cylinder 104, so the grounds cup 102 essentially rests in the grounds cup holder 34 for support. At the bottom, the grounds cup 102 has two tapered annular portions 115 and 116 that terminate with a perforated bottom or sieve portion 117.

In accordance with one aspect of this invention, the depth of the cylindrical wall 112 is at least equal to the depth of the grounds in the grounds cup 102 plus an amount that enables the piston head 97 to achieve a sealing relationship with the cylindrical wall 112 of the grounds cup 102. This depth provides flexibility to a consumer because a single grounds cup 102 will accommodate coffee in different packages or in different quantities. There is no need to inventory different grounds cups. Further, the grounds cup 102 easily separates from the grounds cup holder 34 for cleaning. This structure also allows an accessory element, such as a crema insert, to be located intermediate the grounds cup 102 and the grounds cup holder 34.

Figure 10:
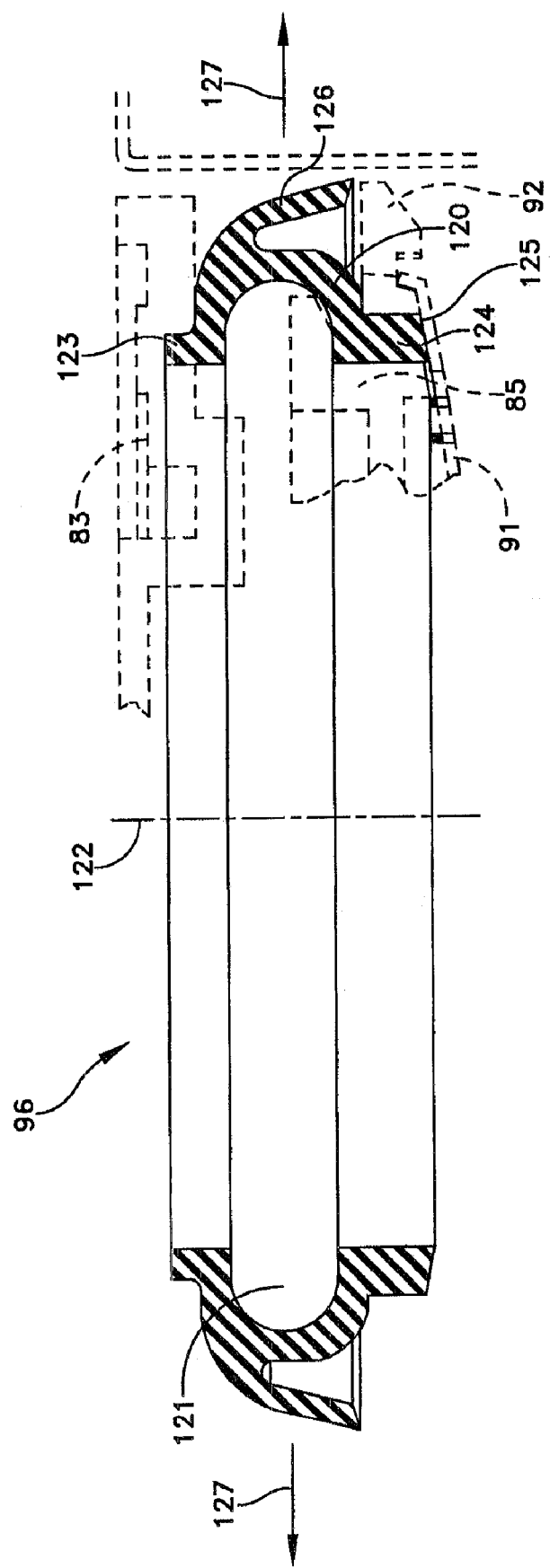
FIG. 10 is a cross section of an active seal shown in FIG. 4.

FIG. 10 depicts the annular seal 96 that is a component of the active seal. The structures in phantom at the right of FIG. 10 are useful in conjunction with other drawings for understanding the relationship of the seal 96 with components of the piston head 97 and its functions. Specifically, the seal 96 has an annular body 120 that has a C-shaped cross section to form a channel 121 with an opening facing a center axis 122. An annular upper lip 123 extends axially and upward to be captured in a groove 124 in the top disk 83. An annular lower lip 124 extends downward axially to terminate with a free end 125. This end is captured between the axial shoulder 86 of the bottom disk 85 and the guide ring 92. The free end 125 bears against the perforated disk 91. An integral obliquely extending exterior skirt 126 can flex radially with respect to the axis 122.

In the relaxed or radially contracted state shown in FIG. 10, the upper lip 123, annular body 120 and lower lip 124 form a flexible coupling that suspends the bottom disk 85 from the top disk 83. The lower lip 124, particularly the surface at the free end 125, forms a seal to confine the hot water under pressure to the volume between the perforated disk 91 and the lower disk 85 including the labyrinth 87. This prevents any water from escaping at the periphery of the piston head 97, particularly at the guide ring 92. When the seal 96 assumes a radially expanded state due to the compression of the wavy spring 95 and movement of the bottom disk 85 toward the top disk 83, the skirt 126 expands into the cylindrical wall 122 thereby to form of peripheral seal that defines an upper limit of the brewing chamber 98 and that confines all the hot water under pressure and brewing coffee to the brewing chamber 98.

FIGS. 6 and 7 depict the espresso machine 20 with the piston 97 and threaded piston rod 74 retracted to an open position, the arm 76 having activated the upper limit micro switch 100. In this fully retracted position, the compacting apparatus 60 has retracted the piston head 97 to a position that allows the infusion chamber assembly 32 to be inserted into the brewing station 33 with coffee 130. The circumferential ribs 105 engage the support provided by the shelf 63 in FIG. 2. When fully seated, the grounds cup holder 34 engages the interlock 64. When the structures are oriented as shown in FIGS. 6 and 7, the wavy spring 95 separates the top and bottom disks 83 and 85 by a maximum distance so that the seal 96 is in its radially contracted state.

Figure 11A:
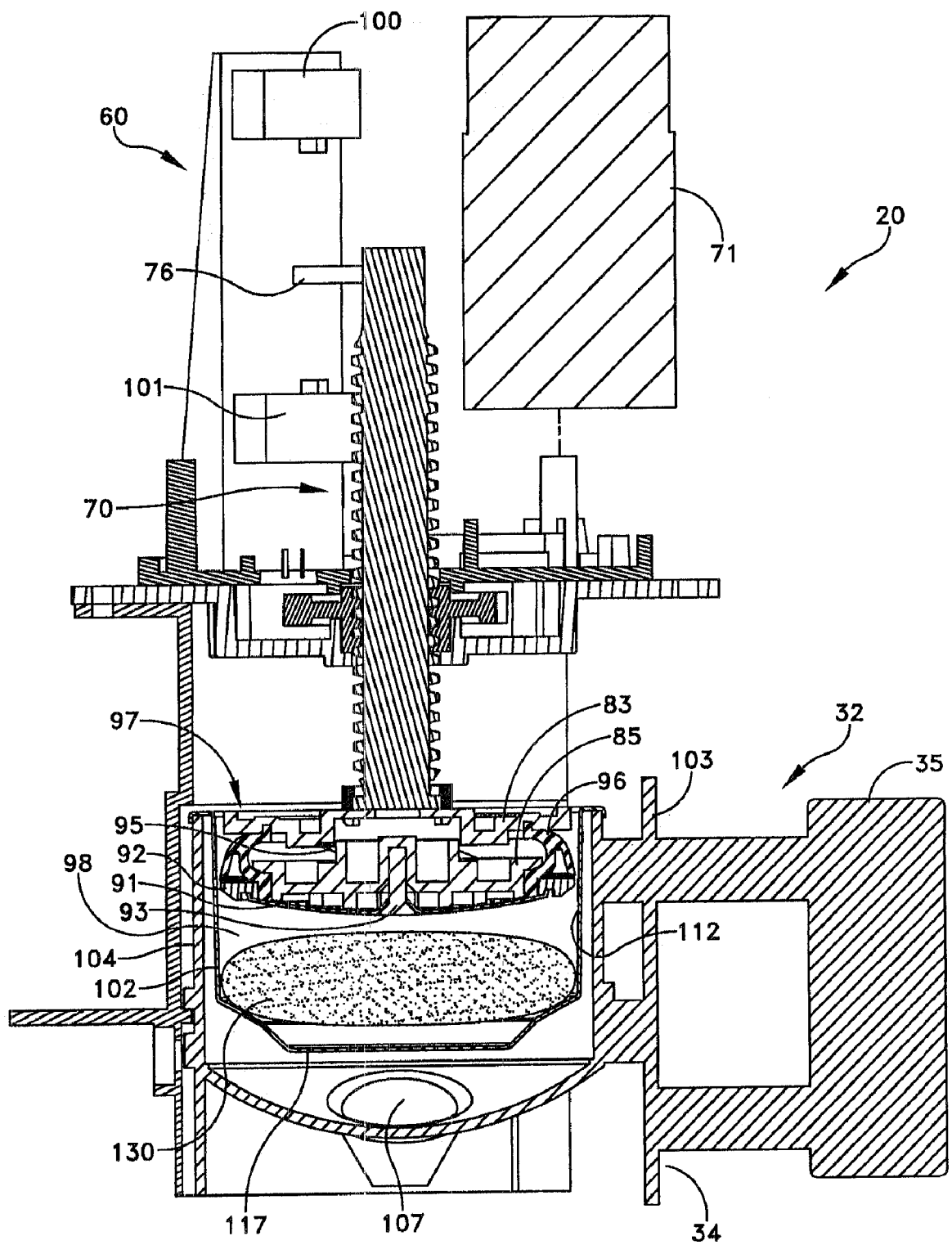
FIG. 11A is a cross section that depicts the compacting structure of FIG. 4 in an intermediate position with the compacting structure located within the infusion chamber assembly.
Figure 11B:
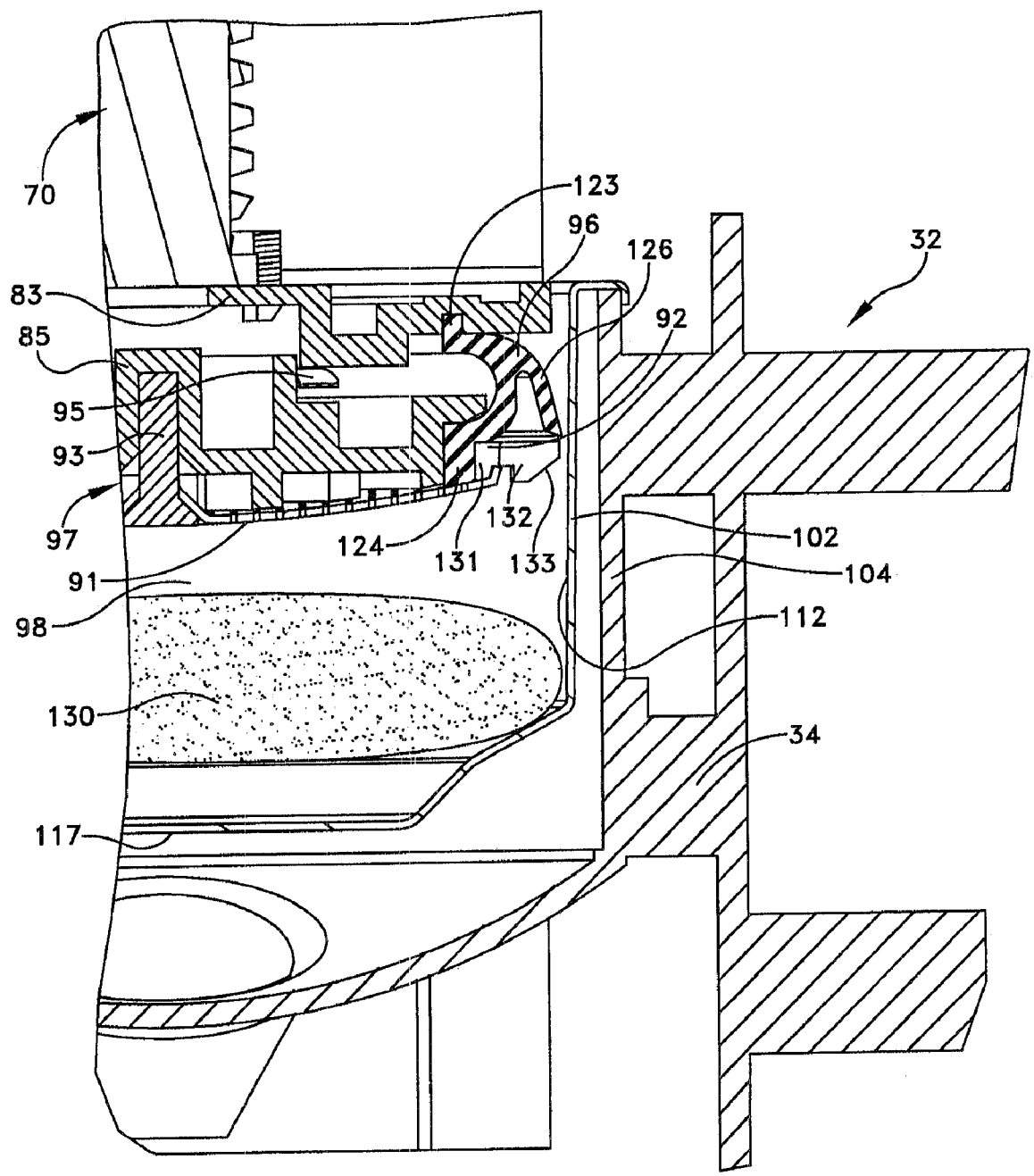
FIG. 11B is an enlarged detailed portion of the structure shown in FIG. 12A.

As described later, when water temperature and other conditions are satisfied, the consumer pushes the brewing switch 47 in FIG. 1. The motor 71 displaces the threaded piston rod 74 and piston head 97 toward the infusion chamber assembly 32. FIGS. 11A and 11B depict the piston head 97 as it first enters the grounds cup 102. The seal 96, particularly the seal skirt 126, is spaced from the grounds cup cylinder 112.

As will be apparent, the position of the grounds cup 102 relative to the piston head 97 will not be held to close tolerances. Thus, it is possible for a misalignment to exist during normal operations. In contemplation of this possibility, the guide ring 92 shown in FIGS. 4, 11A and 11B serves to prevent any damage to the seal 96. Specifically, the guide ring 92 has an annular body 131 and angularly spaced, radially extending tabs 132 with outer, downwardly located chamfers 133. Should there be any misalignment, a chamfer 133 will contact the lip 113 and center the piston head 97 within the grounds cup 102. Thus the wall 112 does not contact the skirt 126 as the piston head 97 enters the brewing chamber 98 Consequently the guide ring 92 protects the seal 96 from damage. Moreover there is no wear on the seal 96 during this downward motion.

The motor 71 continues to drive the threaded piston rod 74 and piston head 97 downward with the configuration shown in FIGS. 11A and 11B, until the perforated disk 91 contacts the ground coffee 130. Further downward motion of the piston head 97 begins to compact the ground coffee 130. In addition at some point the force exerted on the peripheral disk 91 will be greater than the force exerted by the wavy spring 95. As a result, the distance between the top and bottom disks 83 and 85 decreases. Consequently the seal 96 moves to the radially expanded state and drives the skirt 126 against the cylinder wall to form the seal.

As the ground coffee compacts, the load on the motor 71 increases. When the current reaches a first specified threshold, the motor 71 is de-energized. The gear ratios lock the piston head 97 in its vertical position. The seal formed by the skirt 126 now defines the top of the brewing chamber 98. This event enables hot water to pass from the boiler 55 through the hose 57 and the piston 97 and to permeate the coffee 130 under pressure.

As can be seen from FIG. 4, the heated water under pressure from the liquid supply including the water reservoir 30, pump 54, boiler 55, flow meter 56 and inlet hose 57 travels through the nipple 90 to emerge in the labyrinth 87. The pressure required to displace the water into the labyrinth 87 is less than that needed to force the water through the perforated disk 91 and the compacted coffee grounds 134 in FIGS. 12A and 12B. Thus, the water initially fills the labyrinth 87 and then passes through the entire surface of the perforated disk 91 bounded by the lower lip 124 of the seal 97 thereby to permeate the ground coffee 130 uniformly.

Figure 12A:
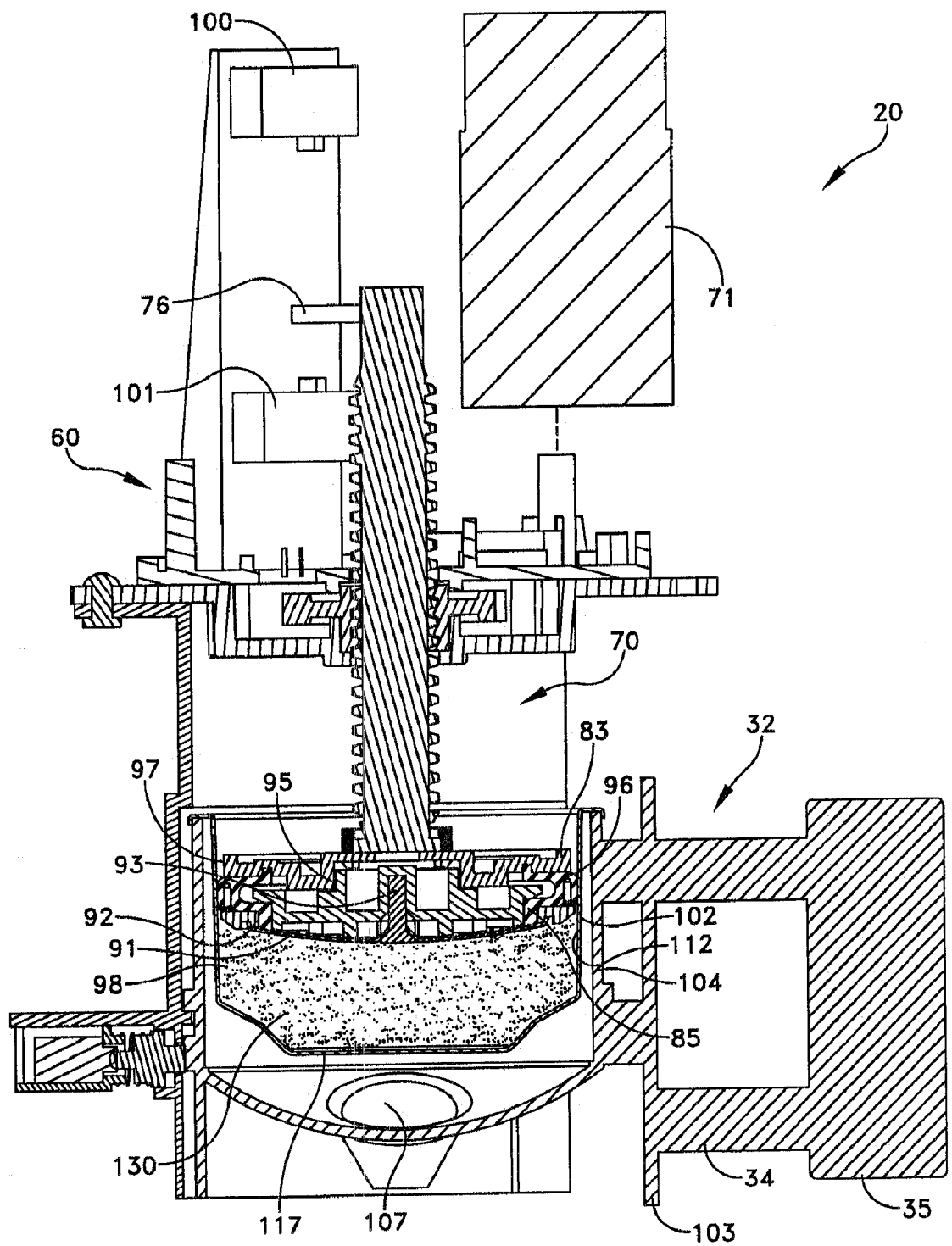
FIG. 12A is a cross section that depicts the compacting structure of FIG. 4 in a position that compacts the ground coffee in the infusion chamber assembly.
Figure 12B:
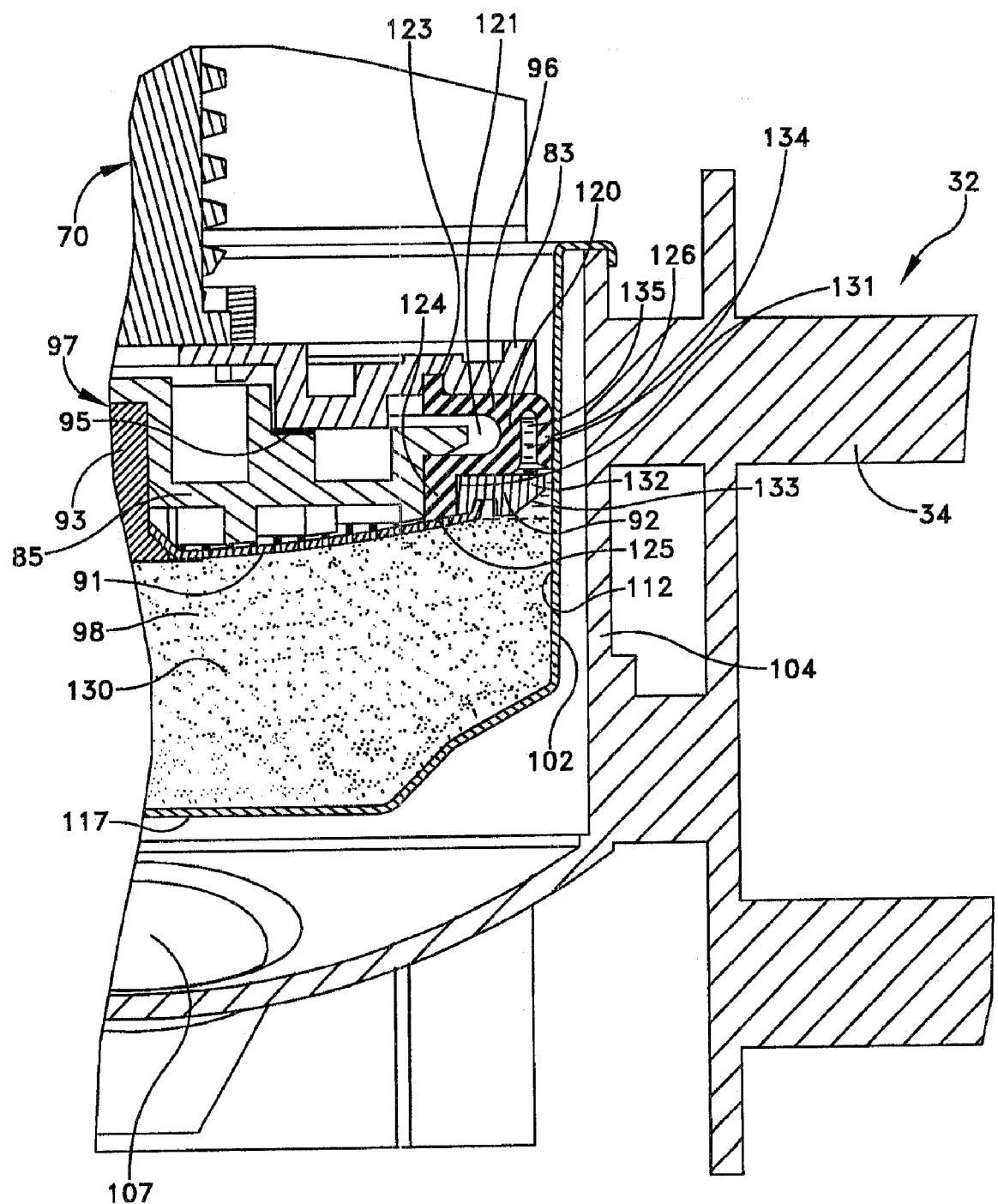
FIG. 12B is an enlarged detailed portion of the structure shown in FIG. 12A.

Referring to FIG. 12B, the brewed coffee 134 in the brewing chamber 98 above the ground coffee 130 may be under pressure. To the extent such pressure exists, it does not detract from the sealing force that drives the skirt 126 against the cylindrical wall 122. Although such brewed coffee 134 enters a gap 135 between the seal body 120 and skirt 126, it produces an additive pressure component that further perfects the seal. Consequently the compacting apparatus 60 provides both compacting force and a mechanism for controlling the active seal.

In one embodiment of this invention, the brewing cycle has another step. After the brewing cycle is completed the motor 71 is energized again to drive the threaded piston rod 74 downwardly thereby over compacting the coffee grounds 130 to extract additional beverage. This downward force increases motor current to a next higher threshold. When the threshold is reached, the motor 71 reverses to retract the threaded piston rod 74 and piston head 97 back to the position shown in 11A.

During the processes of compression and over compression and initial retraction, the seal 96, primarily the skirt 126, undergoes only minimal sliding against the cylindrical wall 112. As soon as the motor 71 produces any significant upward displacement during retraction, the wavy spring 95 begins to expand to separate the top and bottom disks 83 and 85 so the seal 96 with its skirt 126 retracts radially from the cylindrical wall 112. Consequently, the seal 96 will not wear and have a long life.

When the motor 71 fully retracts the threaded piston rod 74 and the piston head 97, the radial arm 76 again engages the upper limit microswitch 100 to de-energize the motor 71 and conclude the brewing cycle, so a consumer can remove a cup and drink the beverage. Also in this position, the consumer can easily remove the infusion chamber assembly 32 from the brewing station 33 for cleaning after each use and for filling with fresh ground coffee.

Generally this per use cleaning of the infusion chamber assembly 32 will be sufficient. Cleaning the piston head 97 can be done less frequently because during brewing the only elements in contact with brewed coffee and coffee grounds are the infusion chamber assembly 32 and the bottom surface of the piston head 97, that is, the perforated disk 90 and guide ring 92 and the surface of the seal 96 at a gap 135. The water under pressure prevents the bottom disk 85 including the labyrinth 87, upper disk 83 and internal surfaces of the seal 96 from accumulating any residue.

Figure 13:
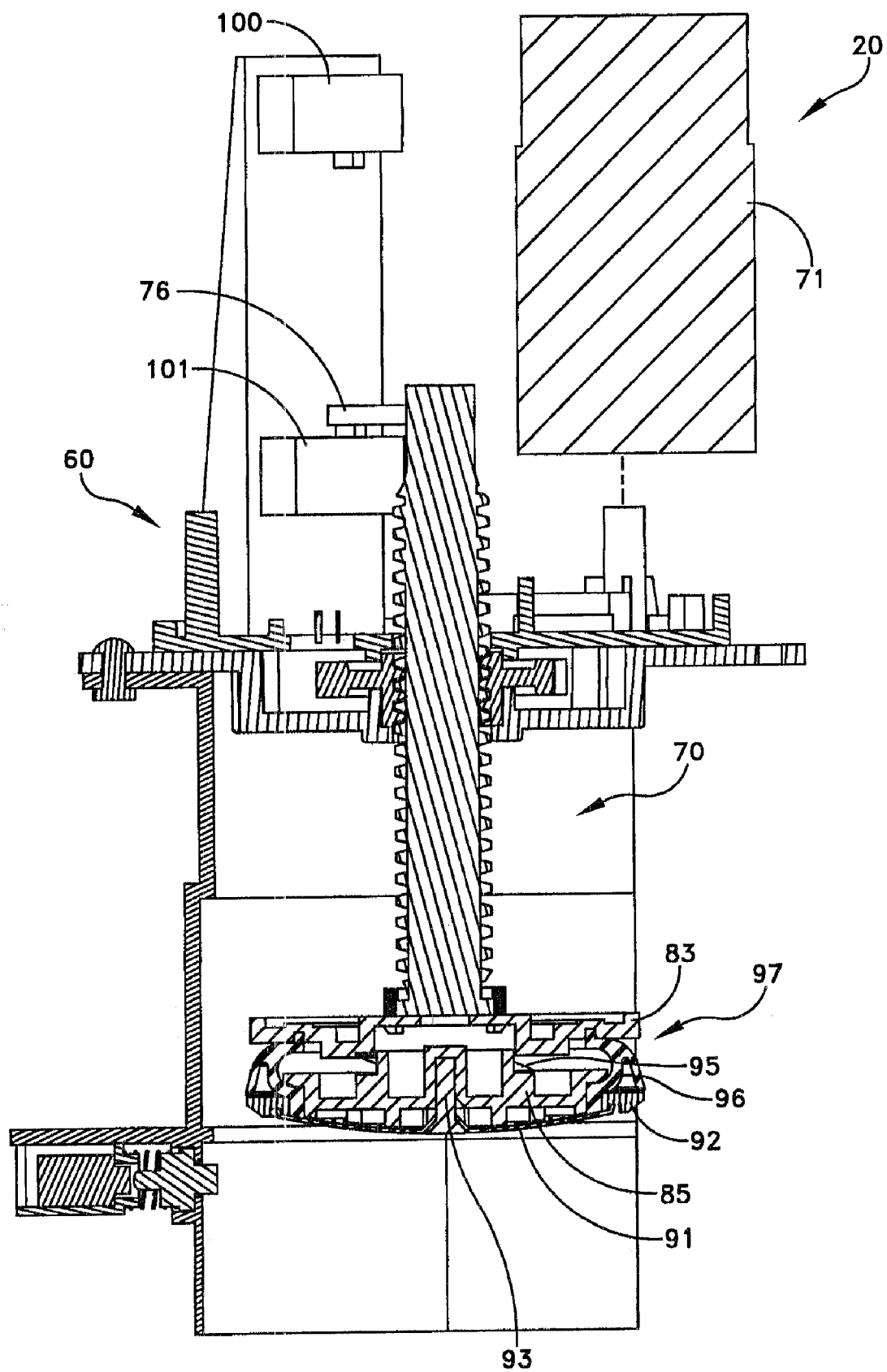
FIG. 13 is a cross section that depicts the compacting structure of FIG. 4 in a fully extended position that facilitates cleaning.

When it is desired to clean the piston head 97, the consumer initiates a cleaning cycle by activating a "clean" switch 136 in FIG. 1 while the infusion chamber assembly 32 is removed. This operation energizes the motor 71 and drives the threaded piston 74 downwardly until the arm 76 strikes the lower limit microswitch 101. As shown in FIG. 13, the entire piston assembly 97 is then accessible for cleaning in the brewing station 33. Generally it is merely necessary to wipe the surface of the perforated disk 91 and guide ring 92 with a damp cloth or sponge. A more thorough cleaning might be achieved by means of a special cleaning cycle, like a brew cycle, with an infusion chamber assembly 32 inserted at the brewing station 33.

Figure 14:
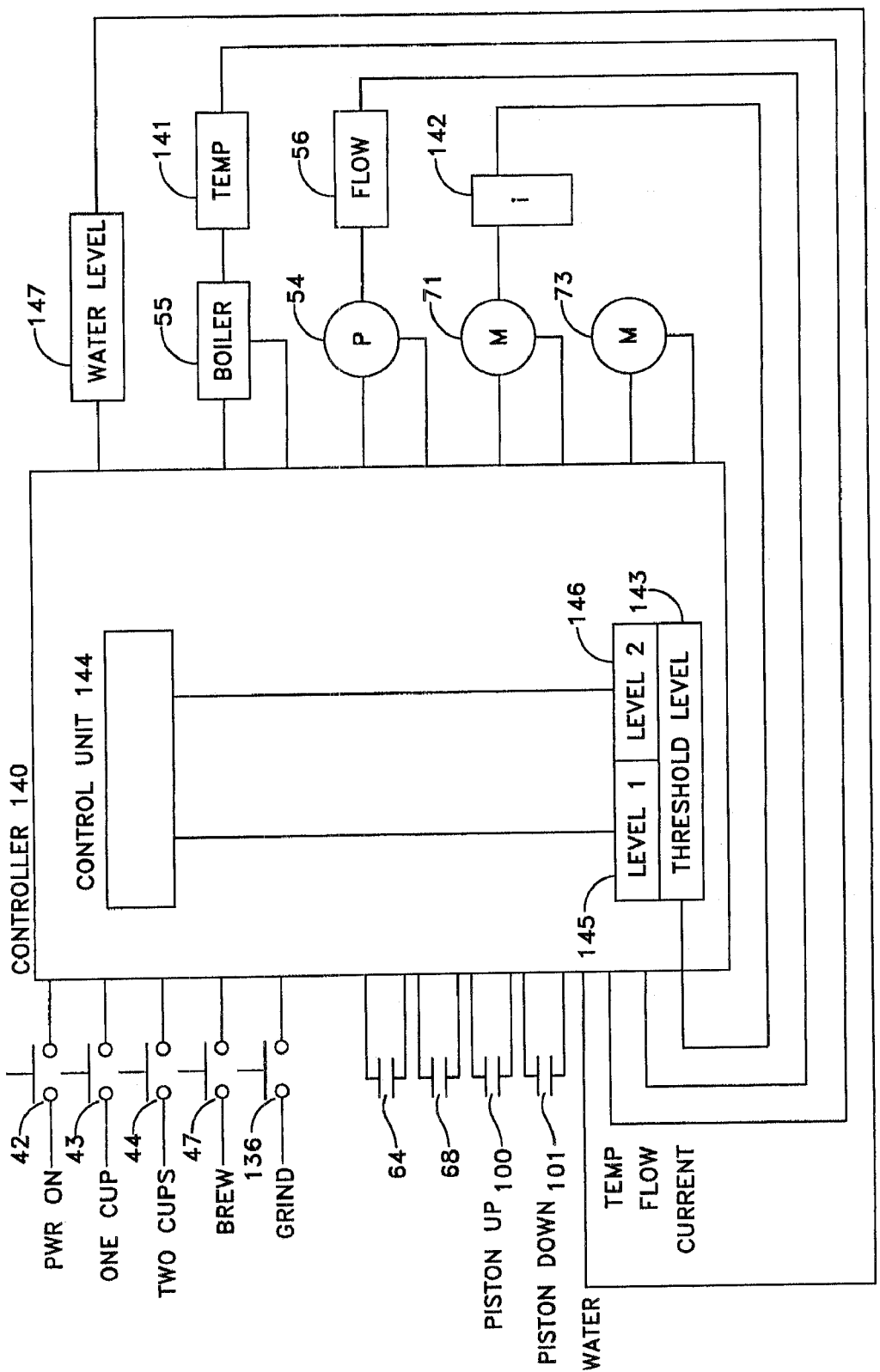
FIG. 14 is a simplified schematic view of a control system for operating the espresso machine shown in FIG. 1.

FIG. 14 is a block schematic that summarizes the various control inputs and outputs that can be utilized in the espresso machine 20 of FIG. 1. In this specific embodiment, a controller 140 has connections to the water pump 54, the boiler 55, the flow meter 56, the piston motor 71 and the grinder 56. The flow meter 56 produces a FLOW input signal for the controller 140. A temperature sensing circuit 141 generates a TEMP input signal. A current sensor 142 provides a CURRENT signal to a threshold level circuit 143. The threshold level circuit produces one of two outputs to a control unit 144. The first is from a LEVEL 1 detector 145 that represents the current that exists as compacting assembly 60 compacts the coffee grounds to an appropriate level. A LEVEL 2 detector 146 is set at a higher level and serves to provide a reversing signal for the post brewing over compression sequence. A water level sensor 147 indicates the presence of a sufficient quantity of water for a brewing operation.

The upper limit microswitch 100 and the lower limit microswitch 101 provide two other control inputs to the controller 140. Still other control inputs are provided by the interlock 64 that indicates the proper alignment of the infusion chamber assembly 32 in the brewing station 33. The interlock 68 indicates the proper positioning of the infusion chamber assembly 32 in the fill station 40. Other inputs include the power-on switch 42, the one-cup and two-cup switches 43 and 44, the brewing switch 47 and the grind switch 136.

Figure 15:
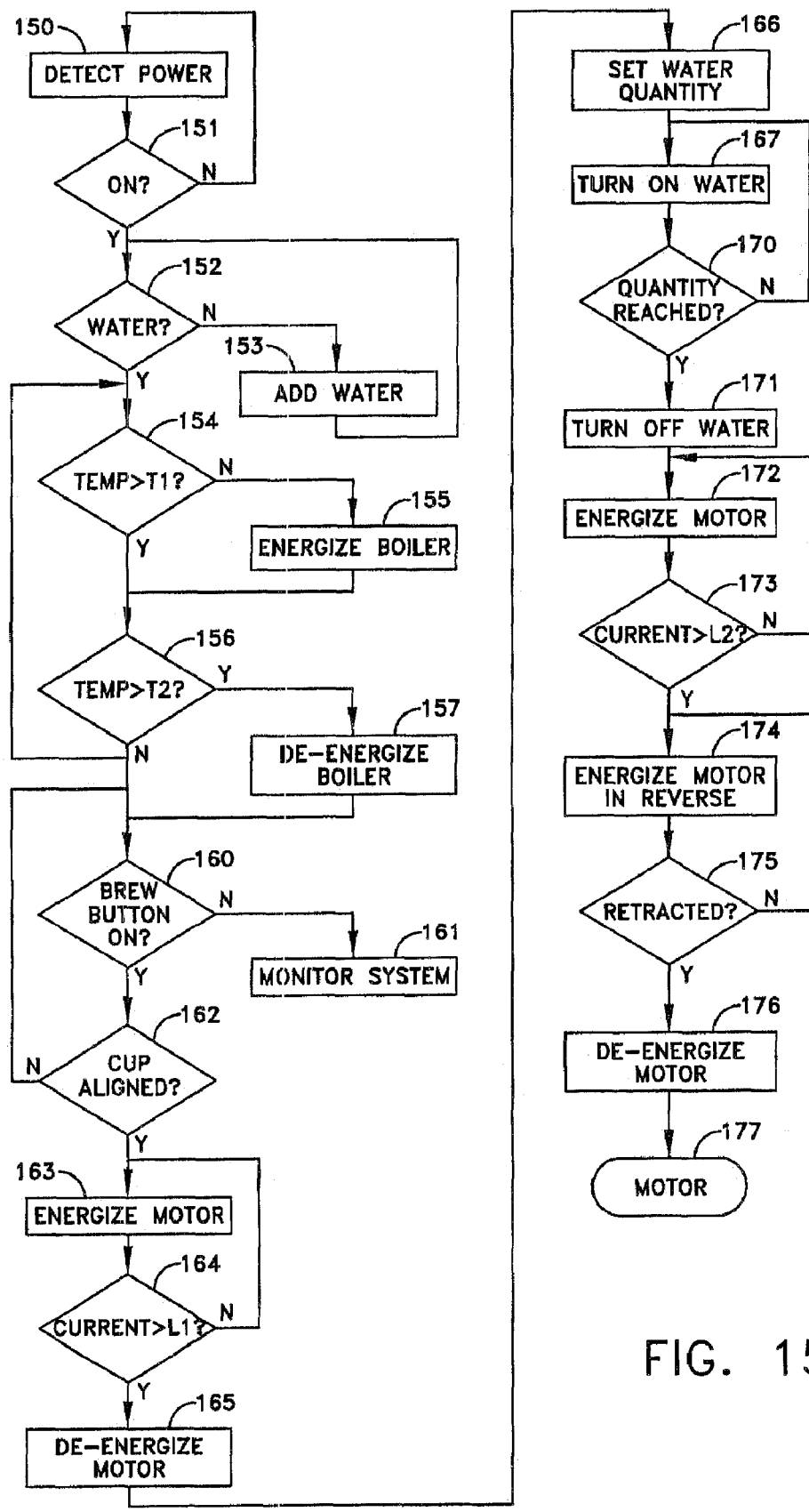
FIG. 15 is a flow chart depicting one embodiment of the operation of the control system in FIG. 14.

FIG. 15 is a basic flow diagram for outlining the logical operations that can occur within a controller 140, including the control unit 144. When the apparatus 20 is plugged into an outlet, control unit 144 is enabled and step 150 senses the existence of a full power status. When that condition is realized, step 151 transfers control to step 152 and may at that point also energize a power-on annunciator.

Step 152 reads the input signal from the water level sensor 147 in FIG. 14. If insufficient water exists, step 152 waits for water to be added by the consumer in step 153. When that test is completed, step 154 determines whether the water temperature is above a first operating threshold, typically set at the bottom of an acceptable brewing temperature range. On initialization this typically will not be the situation, so control passes from step 154 to step 155 to energize the boiler 55. Steps 156 and 157 also monitor the water temperatures for values in excess of an upper limit of an acceptable range for de-energizing the boiler in step 157. As shown this control sensor enters into a loop including steps 154 through 157 thereby to constantly control the temperature of the water during the brewing cycle Once the water temperature is in an appropriate range, the consumer receives a notification as the illumination of a ready to brew light. This may initiate a time-out to limit the maximum interval before the brew button 47 in FIGS. 1 and 14 is actuated. The time-out interval terminates the operation of the boiler 55.

Once the brew button 47 is actuated, control passes to step 162 to determine whether the infusion chamber assembly 32 is properly aligned by monitoring the interlock switch 64 shown in FIGS. 2 and 14. When both the conditions of steps 160 and 162 are met within the time-out interval, step 163 energizes the motor 71 to extend the piston head 97. When the piston head 97 begins to compact the ground coffee as shown in FIG. 12A, the signal from the motor current sensor 142 increases until the current reaches the first threshold established by the Level 1 detector 145. When this occurs, step 156 de-energizes the motor 71. Now the system is ready to infuse the compacted ground coffee.

Next the control unit 144 determines whether the one-cup switch 43 or the two-cup switch 44 has been actuated. As will be apparent, such switches should be ganged so only one of the two switches can be depressed at any time. Step 166 establishes the amount of water that must transfer through the brewing chamber 98 in response to the selection of one or two cups. Step 167 energizes the pump 154 so heated water flows to the brewing chamber 98 until the flow meter 56 records the specified quantity. When this occurs step 171 turns off the water.

Step 172 then energizes the motor to produce overcompacting. Step 173 monitors the current from the current sensor 142 until the Level 2 detector 146 indicates that second threshold has been reached. At that point step 174 reverses the motor and begins the retraction process. When the radial arm 76 engages the upper limit microswitch 100, step 175 transfers control to de-energize the motor at step 176. As will be apparent, when step 176 de-energizes the motor, the brewing cycle has been completed.

In summary, the espresso machine 20 of FIG. 1, specifically the structure that forms the brewing chamber 98 including the infusion chamber assembly 32 with its grounds cup 102 and the piston head 97 with its seal 96, facilitates and simplifies an operation by which coffee grounds are compacted and then infused under pressure. Sealing is enhanced because the water pressure acts to increase, rather than decrease, the sealing force. Further, as the seal is radially contracted for most discrete piston head motion, it will have a long life. As a result it is possible to construct a brewing chamber that is sealed across the top with a single piston and that enables the infusion chamber assembly 32 to be removed for cleaning and to be transferred to a remote site for receiving ground coffee, such as at the fill station 40 or even some separate filling position remote from the apparatus 20.

The simplicity of this design allows the espresso machine 20 to be available for consumers with many of the advantages of the more expensive commercial systems. Yet this espresso machine 20 is easy to use because there is no need for a consumer to manipulate manual latching mechanisms. Moreover, owing to the fact that the seal 96 seals against the side wall 112 of the grounds cup 102 the machine can accommodate ground coffee or a variety of coffee pods of different diameters and in differing amounts and quantities up to some arbitrary maximum depending on the depth of the grounds cup 102. As a result, the espresso machine 20 in FIG. 1 is readily adapted for accommodating a wide range of infusible materials.

This invention has been disclosed in the form of a particular espresso machine 20. It will be apparent, however, that variations could be incorporated or applied to the specifically enclosed embodiment without departing from the invention. For example, the compacting assembly 60 of FIGS. 4, 6 and 7 utilizes a particular motor and drive means for producing the vertical displacement of the piston head 97. Mechanical, hydraulic, pneumatic or other mechanisms and driving structures might be utilized for displacing the piston head 97 to its various positions. The piston head 97 is disclosed with a particular arrangement of top and bottom disks, an intermediate spring and a sealing structure. Alternate implementations of each of those elements could provide equivalent functions. For example, the specifically disclosed structure of the seal 96 with the skirt 126 is particularly suited for the high-pressure environment associated with espresso brewing applications. The pressure required to brew regular coffee is considerably less. In such an application a variation of the active seal 96 with the skirt removed may be substituted. As another alternative, the active seal could be replaced by a passive seal, such as an O-ring. The grounds cup 102 is disclosed as a deep drawn element; shallower grounds cup could be substituted. Accessory devices might be interposed between bottoms of the grounds cup 102 and the grounds cup holder 32, all while still realizing some, if not all, the advantages of this invention. The specifically disclosed control sequence could be altered while still achieving the advantages of this invention.

Therefore, it is the intent of the appended claims to cover all such variations and modifications as come within the true spirit and scope of this invention.

The invention claimed is:

1. Apparatus for brewing beverages by supplying a liquid under pressure to an infusible material, said apparatus comprising:
   A) infusion chamber means for receiving the infusible material including a side wall, an open top and a perforated bottom, and
   B) piston means for compacting the infusible material and dispersing the liquid, said piston means including piston head means for forming a brewing chamber in said infusion chamber means and piston rod means for moving said piston head means past said open top, said piston head means having an active peripheral sealing means including:
      i) first means fixed to said piston rod means for forming a rigid structure,
      ii) second means for compacting the infusible material and dispersing the liquid and including:
         a) means for forming a labyrinth facing said brewing chamber, and
         b) perforated disk means overlying said labyrinth for distributing the liquid under pressure evenly over the infusible material during brewing,
      iii) sealing means attached to each of said first and second means for suspending said second means from said first means, and
      iv) spring means intermediate said first and second means for separating said first and second means when said piston head means is spaced from the infusible material whereby said seal means contracts from said side wall of said infusion chamber means, said second means overcoming the bias of said spring means during compaction of the infusible material whereupon said seal means expands into a sealing engagement with the side wall and said piston head means and said infusion chamber means form the brewing chamber.

2. Apparatus as recited in claim 1 wherein said sealing means includes a peripheral sealing portion for sealing the periphery of said perforated disk means and said labyrinth forming means whereby liquid emerges from said piston head means into the infusible material only through said perforated disk means.

3. Apparatus as recited in claim 1 wherein said sealing means includes an annular flexible body portion with first and second lip means for attachment to said first and second means.

4. Apparatus as recited in claim 3 wherein said first and second means include first and second attachment means for attaching to said first and second lip means, respectively.

5. Apparatus as recited in claim 1 wherein said sealing means includes skirt means for forming a seal with said side wall when said active sealing means is in its expanded state.

6. Apparatus as recited in claim 5 wherein said skirt means extends from the periphery of said annular flexible body portion.

7. Apparatus as recited in claim 6 wherein said second means additionally includes guiding means for aligning said piston head means with said infusion chamber means thereby to protect said skirt means from damage when said piston head means moves in said infusion chamber means.

8. Apparatus for brewing beverages by supplying a liquid under pressure to an infusible material wherein said apparatus includes an infusion chamber including a side wall, an open top and a perforated bottom and a piston including a piston head that forms a brewing chamber in said infusion chamber and a piston rod that moves said piston head past said open top, said piston head having an active peripheral seal comprising:
   A) a first rigid disk fixed to said piston rod,
   B) a second disk including a labyrinth facing said brewing chamber and a perforated disk overlying said labyrinth that distributes the liquid under pressure evenly over the infusible material during brewing,
   C) a seal captured by each of said first and second disks that suspends said second disk from said first disk, and
   D) a spring intermediate said first and second disks that separates said first and second disks when said piston head is spaced from the infusible material whereby said seal contracts from said infusion chamber side wall, said second disk overcoming the spring bias during compaction of the infusible material whereupon said seal expands into a sealing engagement with the side wall and said piston head and said infusion chamber form the brewing chamber.

9. Apparatus as recited in claim 8 wherein said seal includes a peripheral sealing portion that seals the periphery of said perforated disk and said second disk whereby liquid emerges from said piston head means into the infusible material only through said perforated disk.

10. Apparatus as recited in claim 8 wherein said seal includes an annular flexible body portion with first and second lips attached to said first and second disks, respectively.

11. Apparatus as recited in claim 10 wherein said first and second disks include first and second attachment means for attaching to said first and second lips, respectively.

12. Apparatus as recited in claim 10 wherein said seal includes a skirt attached to said body portion forming a seal with said infusion chamber when said active peripheral seal expands.

13. Apparatus as recited in claim 12 wherein said skirt extends from the periphery of said annular flexible body portion.

14. Apparatus as recited in claim 13 wherein said second disk additionally includes a guide that aligns said piston head with said infusion chamber thereby to protect said skirt from damage when said piston head moves into said infusion chamber.

* * * * *